United States Patent
Saeki et al.

(10) Patent No.: US 8,386,105 B2
(45) Date of Patent: Feb. 26, 2013

(54) FUEL CELL VEHICLE

(75) Inventors: Hibiki Saeki, Utsunomiya (JP); Yu Tachibana, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 307 days.

(21) Appl. No.: 12/740,967

(22) PCT Filed: Jan. 16, 2009

(86) PCT No.: PCT/JP2009/050522
§ 371 (c)(1),
(2), (4) Date: Apr. 30, 2010

(87) PCT Pub. No.: WO2009/130921
PCT Pub. Date: Oct. 29, 2009

(65) Prior Publication Data
US 2010/0332063 A1 Dec. 30, 2010

(30) Foreign Application Priority Data
Apr. 25, 2008 (JP) ................................ 2008-114928

(51) Int. Cl.
*G06G 1/14* (2006.01)
(52) U.S. Cl. .................................................... 701/22
(58) Field of Classification Search .................. None
See application file for complete search history.

(56) References Cited

U.S. PATENT DOCUMENTS

| | | | |
|---|---|---|---|
| 6,255,008 B1 | 7/2001 | Iwase | |
| 6,587,356 B2* | 7/2003 | Zhu et al. | 363/17 |
| 6,930,897 B2* | 8/2005 | Jungreis et al. | 363/95 |
| 7,088,595 B2* | 8/2006 | Nino | 363/17 |
| 7,161,331 B2* | 1/2007 | Wai et al. | 323/222 |
| 7,456,602 B2* | 11/2008 | Hampo et al. | 318/800 |
| 7,728,545 B2* | 6/2010 | Kanouda et al. | 320/101 |
| 7,816,884 B2* | 10/2010 | Wake et al. | 320/101 |
| 7,828,093 B2* | 11/2010 | Hanada et al. | 180/65.265 |
| 7,830,236 B2* | 11/2010 | Raiser et al. | 336/212 |
| 7,932,634 B2* | 4/2011 | Bourilkov et al. | 307/46 |
| 8,009,446 B2* | 8/2011 | Chou et al. | 363/41 |
| 8,026,691 B2* | 9/2011 | Nagashima et al. | 318/801 |
| 8,116,103 B2* | 2/2012 | Zacharias et al. | 363/17 |
| 2006/0012340 A1 | 1/2006 | Saeki et al. | |
| 2007/0275276 A1 | 11/2007 | Saeki et al. | |
| 2009/0029197 A1 | 1/2009 | Hibino et al. | |
| 2009/0148735 A1 | 6/2009 | Manabe et al. | |

FOREIGN PATENT DOCUMENTS

| | | |
|---|---|---|
| JP | 2000-36308 | 2/2000 |
| JP | 2005-251674 | 9/2005 |
| JP | 2007-5038 | 1/2007 |
| JP | 2007-184243 | 7/2007 |
| JP | 2008-91319 | 4/2008 |

OTHER PUBLICATIONS

International Search Report for PCT/JP2009/050522 dated Apr. 28, 2009.

* cited by examiner

*Primary Examiner* — Mussa A Shaawat
(74) *Attorney, Agent, or Firm* — Nelson Mullins Riley & Scarborough LLP; Anthony A. Laurentano (57) ABSTRACT

A fuel cell vehicle comprises a motor, a fuel cell, a first DC/DC converter, and a first converter control unit. The first DC/DC converter performs a boosting operation when the fuel cell vehicle runs in a non-stationary state, and does not perform the boosting operation during the vehicle runs in a stationary state.

11 Claims, 10 Drawing Sheets

FUEL CELL VEHICLE

RELATED APPLICATIONS

This application is a 35 U.S.C. 371 national stage filing of International Application No. PCT/JP2009/050522, filed on Jan. 16, 2009, which claims priority to Japanese Patent Application No. 2008-114928 filed on Apr. 25, 2008 in Japan. The contents of the aforementioned applications are hereby incorporated by reference.

TECHNICAL FIELD

The present invention relates to a fuel cell vehicle in which the output voltage of a fuel cell is stepped up with a DC/DC converter and supplied to a traction motor. More specifically, the present invention relates to a fuel cell vehicle which enables the electric power saving and miniaturizing of the DC/DC converter mounted thereon.

BACKGROUND ART

There are known fuel cell vehicles which produce drive power by supplying the electric power from a fuel cell to a traction motor. The known fuel cell vehicles include fuel cell vehicles in which the output voltage of a fuel cell is stepped up with a DC/DC converter and supplied to a traction motor (see U.S. Patent Application Publication No. 2006/0012340 and U.S. Patent Application Publication No. 2007/0275276). The fuel cell vehicle disclosed in each of the above publications includes an electric storage device in addition to the fuel cell, and has the traction motor driven by the combined electric power from the fuel cell and the electric storage device.

DISCLOSURE OF THE INVENTION

While the DC/DC converters disclosed in the above publications are effective to control the output voltage of the fuel cell, there is still room for improvement in electric power saving and miniaturizing thereof.

The present invention has been made in view of the above problems. It is an object of the present invention to provide a fuel cell vehicle which enables the electric power saving and miniaturizing of a DC/DC converter mounted thereon for stepping up the output voltage of a fuel cell for a traction motor.

A fuel cell vehicle according to the present invention comprises a traction motor, a fuel cell, a DC/DC converter for stepping up an output voltage of the fuel cell and supplying the stepped-up voltage to the traction motor, and a controller for controlling the supply of electric power to the traction motor, wherein the output voltage of the fuel cell is set to be higher than a necessary voltage of the traction motor when the fuel cell vehicle is in a rated state in which the traction motor operates to produce an output smaller than a continuous rated output thereof, and set to be lower than the necessary voltage of the traction motor when the fuel cell vehicle is in a non-rated state in which the traction motor operates to produce an output larger than the continuous rated output, and the controller controls the DC/DC converter to step up the output voltage of the fuel cell when the controller judges that the output voltage of the fuel cell is lower than the necessary voltage of the traction motor.

According to the present invention, the DC/DC converter steps up the output voltage of the fuel cell in the non-rated state and does not step up the output voltage of the fuel cell in the rated state. Since the DC/DC converter does not need to perform its step-up process when the fuel cell vehicle is in the rated state, the fuel cell vehicle can save electric power. Additionally, in the specifications of the DC/DC converter, it is hardly necessary to take continuous-rating into account, but it is only necessary to take time-rating into account. Therefore, the DC/DC converter can be reduced in size.

The fuel cell vehicle may further comprise a bypass diode for supplying electric power from the fuel cell to the traction motor in bypassing relation to the DC/DC converter.

The fuel cell vehicle may further comprise an electric storage device and a second DC/DC converter disposed between the traction motor and the electric storage device, wherein the controller may perform a voltage target value control process for the second DC/DC converter in either one of the rated state and the non-rated state, and may use different voltage target values respectively in the rated state and the non-rated state.

In this case, preferably, the controller calculates a target current for the fuel cell, and calculates a target voltage for the fuel cell from the target current, and the controller uses the target voltage for the fuel cell as the voltage target value in the rated state and uses the necessary voltage of the traction motor as the voltage target value in the non-rated state.

Instead, the controller may perform a current target value control process for the second DC/DC converter in the rated state, and may perform a voltage target value control process for the second DC/DC converter in the non-rated state.

In this case, preferably, the controller calculates a target current for the fuel cell, and the controller uses the target current for the fuel cell as the current target value in the rated state and uses the necessary voltage of the traction motor as the voltage target value in the non-rated state.

Preferably, the fuel cell vehicle may further comprise a storage unit storing mapped data of requested outputs and necessary voltages of the traction motor.

The controller may compare a target voltage for the fuel cell and the necessary voltage of the traction motor with each other, and determine whether the fuel cell vehicle is in the rated state or in the non-rated state, based on the result of the comparison.

Preferably, the continuous rated output represents a rated guaranteed output as an output of the traction motor that is required for the fuel cell vehicle to climb a target gradient at a target vehicle speed which serves as a vehicle power performance target value, the rated state is a traction motor driving state for driving the traction motor at an output equal to or smaller than the rated guaranteed output, and the non-rated state is a traction motor driving state for driving the traction motor at an output greater than the rated guaranteed output.

BEST MODE FOR CARRYING OUT THE INVENTION

Fuel cell vehicles according to a plurality of embodiments of the present invention will be described below with reference to the drawings.

A. First Embodiment

1. Arrangement of Fuel Cell Vehicle 10

(1) Overall Arrangement

Figure 1:
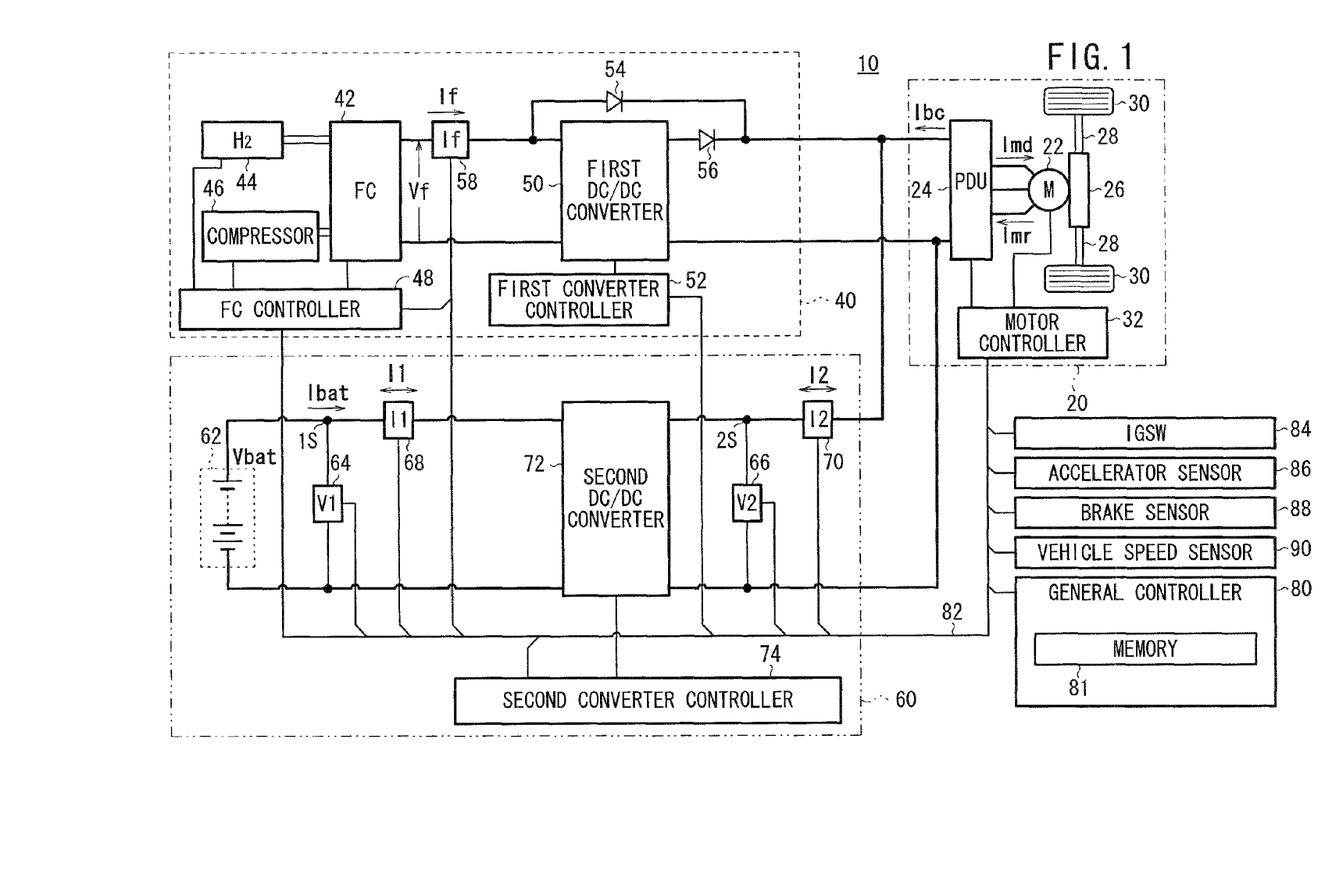
FIG. 1 is a block diagram of a fuel cell vehicle according to a first embodiment of the present invention.

FIG. 1 is a block diagram of a fuel cell vehicle 10 (hereinafter also referred to as "FC vehicle 10") according to a first embodiment of the present invention. The FC vehicle 10 basically includes a motor unit 20, an FC unit 40, a battery unit 60, and a general controller 80.

When the FC vehicle 10 is in a propulsive mode, the motor unit 20 generates propulsive drive power for the FC vehicle 10 with a traction motor 22. When the FC vehicle 10 is in a regenerative mode, the motor unit 20 supplies the battery unit 60 with regenerated electric power [W] generated by the motor 22 (motor-regenerated electric power Preg).

When the FC vehicle 10 is in the propulsive mode, the FC unit 40 supplies the motor unit 20 with electric power [W] generated by the fuel cell 42 (hereinafter also referred to as "FC 42") (FC-generated electric power Pfc). When the FC vehicle 10 is in the regenerative mode, the FC unit 40 supplies the battery unit 60 with the FC-generated electric power Pfc.

When the FC vehicle 10 is in the propulsive mode, the battery unit 60 supplies the motor unit 20 with output electric power [W] from an electric storage device 62 (hereinafter also referred to as "battery 62") as an energy storage (battery output electric power Pbat). When the FC vehicle 10 is in the regenerative mode, the battery unit 60 stores the motor-regenerated electric power Preg and the FC-generated electric power Pfc in the electric storage device 62.

The general controller 80 controls the motor unit 20, the FC unit 40, and the battery unit 60, as will be described in detail later.

The motor-regenerated electric power Preg, the FC-generated electric power Pfc, and the battery output electric power Pbat may be supplied to auxiliaries, not shown, including lights, power windows, windshield wiper motors, etc.

(2) Motor Unit 20

The motor unit 20 includes, in addition to the motor 22, a power drive unit 24 (hereinafter also referred to as "PDU 24"), a speed reducer 26, shafts 28, wheels 30, and a motor controller 32.

When the FC vehicle 10 is in the propulsive mode, the PDU 24 converts a generated DC electric current [A] from the FC 42 (FC-generated current If) and an output current [A] from the battery 62 (battery output current Ibat) into an alternating current, and supplies the alternating current as a current [A] for driving the motor 22 (motor driving current Imd) to the motor 22. The rotation of the motor 22 which is driven by the supplied motor driving current Imd is transmitted through the speed reducer 26 and the shafts 28 to the wheels 30.

When the FC vehicle 10 is in the regenerative mode, the PDU 24 converts a regenerated AC current from the motor 22 (motor-regenerated current Imr) into a DC current, and supplies the DC current as a battery charging current Ibc to the battery unit 60. The battery 62 of the battery unit 60 is charged by the supplied battery charging current Ibc.

The motor controller 32 controls operation of the motor 22 and the PDU 24.

(3) FC Unit 40

The FC unit 40 includes, in addition to the FC 42, a hydrogen tank 44, an air compressor 46, an FC controller 48, a first DC/DC converter 50, a first converter controller 52, a bypass diode 54, a disconnecting diode 56, and a current sensor 58.

The FC 42 is of a stacked structure formed by stacking cells each comprising an anode, a cathode, and a solid polymer electrolyte membrane sandwiched between the anode and the cathode. The FC 42 is connected to the hydrogen tank 44 and the air compressor 46 by pipes. Pressurized hydrogen in the hydrogen tank 44 is supplied to the anodes of the FC 42. Air is supplied from the air compressor 46 to the cathodes of the FC 42. The hydrogen tank 44 and the air compressor 46 are controlled in operation by the FC controller 48. The FC 42 generates the FC-generated current If due to an electrochemical reaction between a reactant gas (fuel gas) of hydrogen and air (oxygen-containing gas). The FC-generated current If is supplied through the current sensor 58, the first DC/DC converter 50, the bypass diode 54, and the disconnecting diode 56 to the PDU 24 when the FC vehicle 10 is in the propulsive mode and to the battery unit 60 when the FC vehicle 10 is in the regenerative mode. The first DC/DC converter 50 comprises a so-called chopper-type step-up DC/DC converter. When the FC-generated current If passes through the first DC/DC converter 50, the first DC/DC converter 50 steps up a voltage [V] generated by the FC 42 (FC-generated voltage Vf). The first DC/DC converter 50 is controlled in operation by the first converter controller 52 based on a command from the general controller 80 and a detected value from the current sensor 58.

(4) Battery Unit 60

The battery unit 60 includes, in addition to the battery 62, voltage sensors 64, 66, current sensors 68, 70, a second DC/DC converter 72, and a second converter controller 74.

The battery 62, which is connected to a primary side 1S of the second DC/DC converter 72, may comprise a lithium ion secondary battery, a nickel hydrogen secondary battery, or a capacitor, for example. In the first embodiment, the battery 62 comprises a lithium ion secondary battery. The voltage sensor 64 detects a voltage [V] across the primary side 1S of the second DC/DC converter 72 (primary voltage V1), and the voltage sensor 66 detects a voltage [V] across a secondary side 2S of the second DC/DC converter 72 (secondary voltage V2). The current sensor 68 detects a current flowing through the primary side 1S (primary current I1), and the current sensor 70 detects a current flowing through the secondary side 2S (secondary current I2).

The second DC/DC converter 72 comprises a so-called chopper-type step-up/down DC/DC converter. When the FC vehicle 10 is in the propulsive mode, the second DC/DC converter 72 steps up the primary voltage V1 and supplies the stepped-up voltage to the secondary side 2S. When the FC vehicle 10 is in the regenerative mode, the second DC/DC converter 72 steps down the secondary voltage V2 and supplies the stepped-down voltage to the primary side 1S. Specifically, the second DC/DC converter 72 converts the secondary voltage V2 as a regenerated voltage [V] generated by the motor 22 (motor-regenerated voltage Vreg) or the FC-generated voltage Vf of the FC 42 into a lower voltage as the primary voltage V1, with which the battery 62 is charged.

The second converter controller 74 controls the second DC/DC converter 72 based on a command from the general controller 80 and detected values from the voltage sensors 64, 66 and the current sensors 68, 70.

(5) General Controller 80

The general controller 80 controls the motor controller 32, the FC controller 48, the first converter controller 52, and the second converter controller 74 based on a requested output [W] of the motor 22 (requested motor output Pmr_req), requested electric power of the FC unit 40 (such as the air compressor 46, etc.), and requested electric power of the auxiliaries, not shown, as described in detail later.

The general controller 80 comprises a CPU, a ROM, a RAM, a timer, input and output interfaces for an A/D converter, a D/A converter, etc., and, if necessary, a DSP (Digital Signal Processor), etc. Each of the motor controller 32, the FC controller 48, the first converter controller 52, and the second converter controller 74 similarly comprises those components.

The general controller 80, the motor controller 32, the FC controller 48, the first converter controller 52, and the second converter controller 74 are interconnected by communication lines 82 such as a CAN (Controller Area Network) of an intravehicular LAN. These controllers perform various functions by sharing input and output information from various switches and various sensors and executing programs stored in the ROMs under the CPUs based on the input and output information from the various switches and various sensors.

(6) Others

The switches and the sensors for detecting vehicle states include, in addition to the voltage sensors 64, 66 and the current sensors 58, 68, 70, an ignition switch 84, an accelerator sensor 86, a brake sensor 88, and a vehicle speed sensor 90, etc. which are connected to the communication lines 82.

2. Various Control/Processing Processes (1) Processing Sequence of the General Controller 80

Figure 2:
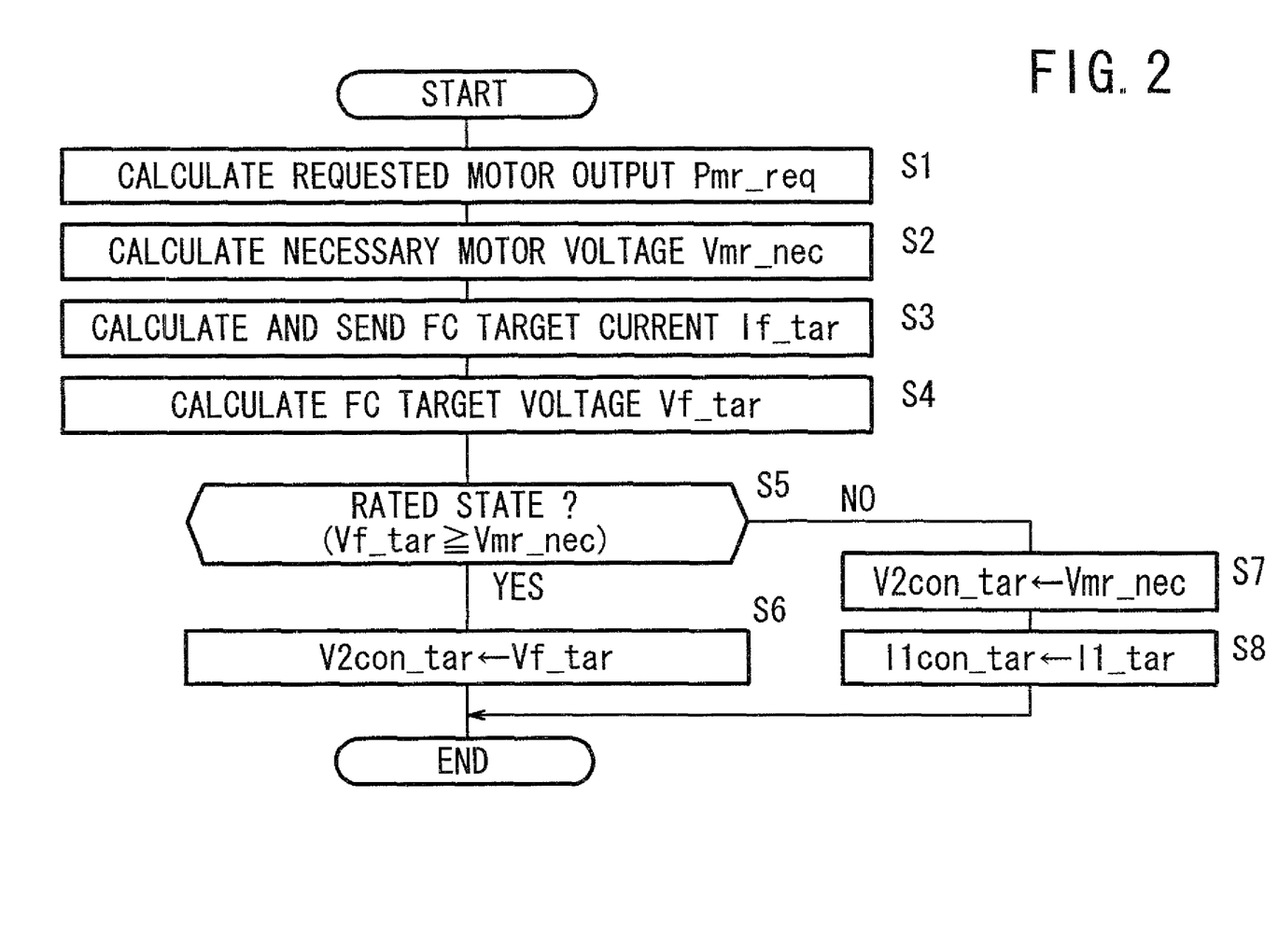
FIG. 2 is a flowchart of a processing sequence of a general controller according to the first embodiment.

FIG. 2 is a flowchart of a processing sequence of the general controller 80 for calculating control target values used by the first DC/DC converter 50 and the second DC/DC converter 72.

In step S1, the general controller 80 calculates a requested motor output Pmr_req depending on the depression of an accelerator pedal, not shown, indicated from the accelerator sensor 86.

In next step S2, the general controller 80 calculates a necessary voltage [V] of the motor 22 (necessary motor voltage Vmr_nec) from the requested motor output Pmr_req. For calculating the necessary motor voltage Vmr_nec, the general controller 80 uses the relationship (mapped data) between requested motor outputs Pmr_req and necessary motor voltages Vmr_nec stored in a memory 81 of the general controller 80.

Figure 3:
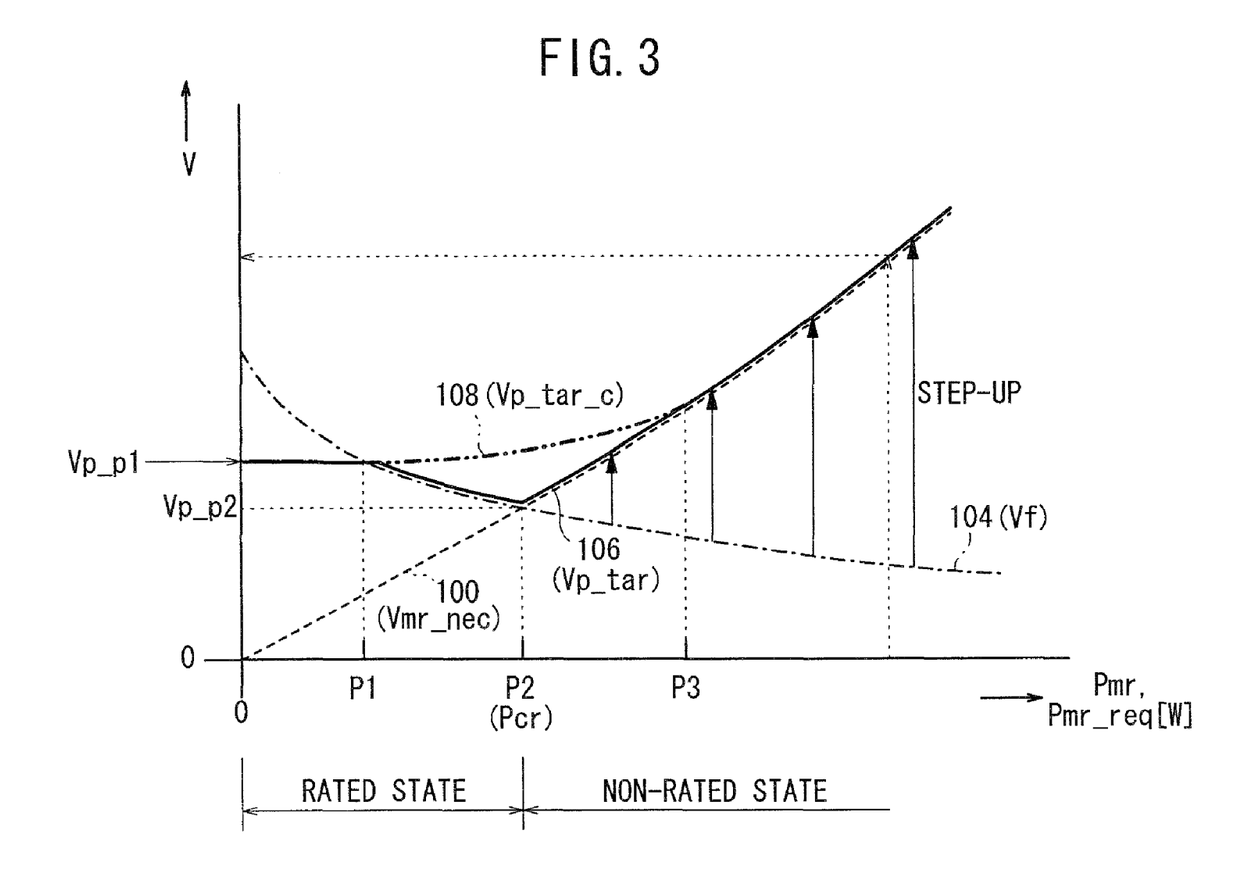
FIG. 3 is a diagram illustrative of the characteristic of a voltage required by a motor, the characteristic of a voltage generated by a fuel cell, and the characteristic of a PDU target voltage according to the first embodiment.
Figure 4:
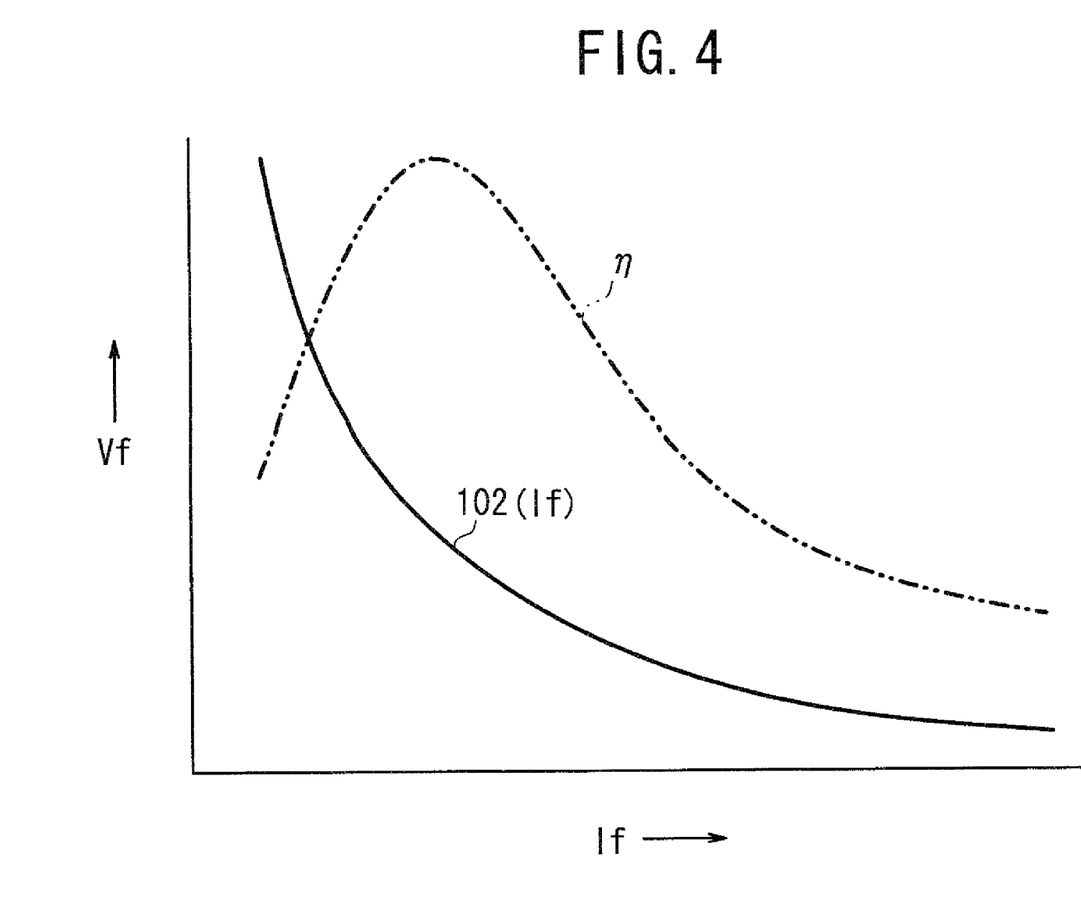
FIG. 4 is a diagram illustrative of the current-voltage characteristic of the fuel cell.

As shown in FIG. 3, the necessary motor voltage Vmr_nec is represented by a characteristic curve 100 (indicated by the dotted line in FIG. 3) which is expressed by a linear function of the requested motor output Pmr_req. As with general fuel cells, the FC 42 according to the first embodiment has a characteristic (I-V characteristic curve 102) (see FIG. 4) such that as the FC-generated current If increases, the FC-generated voltage Vf decreases. The FC-generated voltage Vf is represented by a characteristic curve 104 indicated by the dot-and-dash line in FIG. 3 such that the FC-generated voltage Vf decreases as the output [W] of the motor 22 (motor output Pmr) increases. According to the first embodiment, the specifications of the motor 22 and the FC 42 are determined such that a motor output P2 where the characteristic curve 100 representing the necessary motor voltage Vmr_nec and the characteristic curve 104 representing the FC-generated voltage Vf cross each other is a continuous rated output Pcr of the motor 22. Hereinafter, a state in which the motor output Pmr is equal to or smaller than the continuous rated output Pcr will be referred to as "rated state", and a state in which the motor output Pmr is greater than the continuous rated output Pcr will be referred to as "non-rated state".

Figure 5:
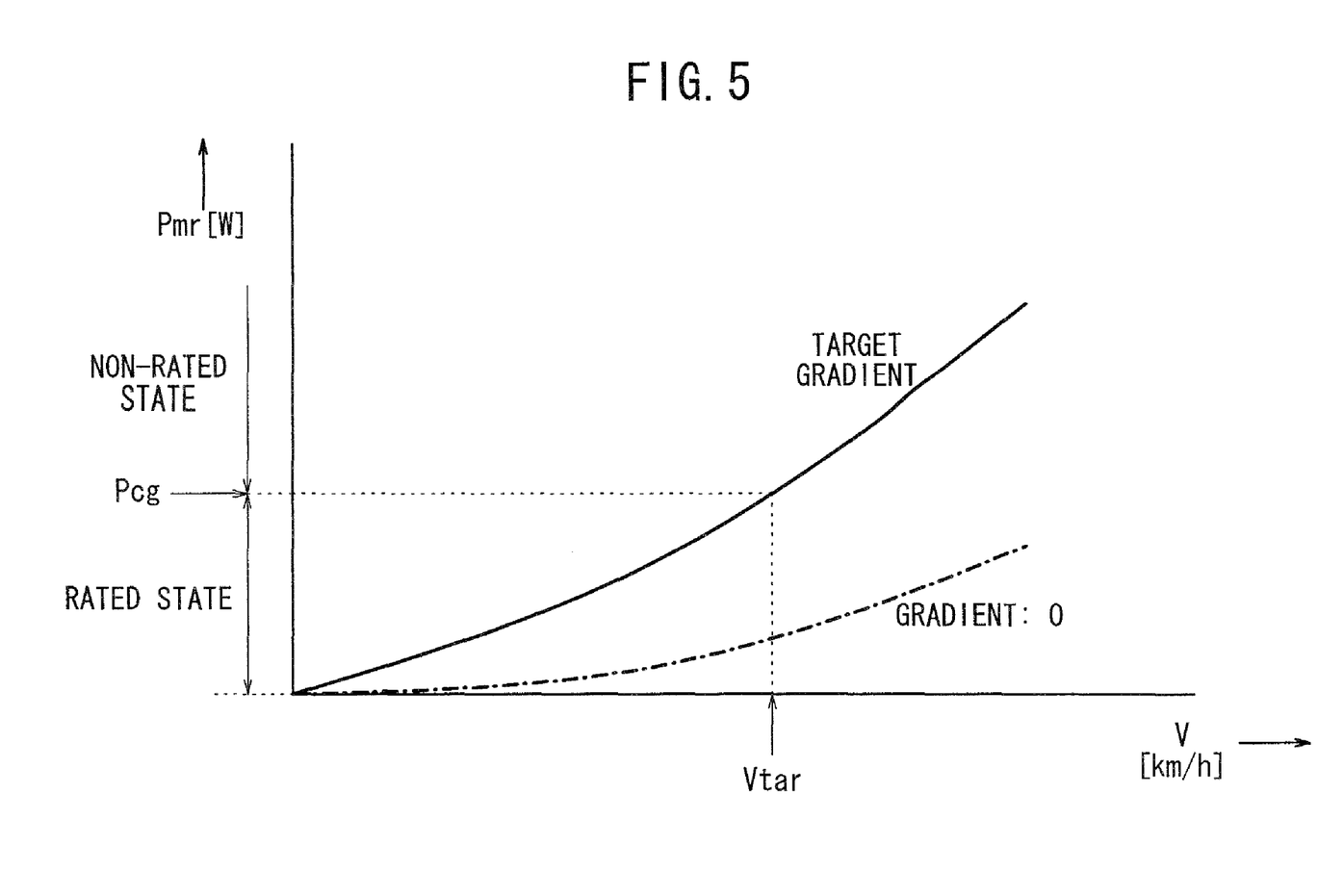
FIG. 5 is a diagram illustrative of a method of determining a continuous rated output.

FIG. 5 is a diagram illustrative of a method of determining the continuous rated output Pcr. According to the first embodiment, the continuous rated output Pcr represents a rated guaranteed output Pcg [W] as a motor output Pmr that is required for the FC vehicle to climb a target gradient at a target vehicle speed Vtar [km/h] which serves as a vehicle power target value. Therefore, the rated state is a traction motor driving state for driving the motor 22 at an output equal to or smaller than the rated guaranteed output Pcg, and the non-rated state is a traction motor driving state for driving the motor 22 at an output greater than the rated guaranteed output Pcg.

Referring back to FIG. 3, a target voltage [V] of the PDU 24 (PDU target voltage Vp_tar) is represented by a characteristic curve 106 (indicated by the solid line in FIG. 3), and is established depending on the requested motor output Pmr_req {Vp_tar=f(Pmr_req)}. The PDU target voltage Vp_tar is established such that when the requested motor output Pmr_req is zero, the PDU target voltage Vp_tar is lower than the FC-generated voltage Vf.

Above a motor output P1 (the motor output Pmr where the characteristic curve 106 representing the PDU target voltage Vp_tar and the characteristic curve 104 representing the FC-generated voltage Vf contact each other) and below a motor output P2 (the motor output Pmr where the characteristic curve 100 representing the necessary motor voltage Vmr_nec and the characteristic curve 104 representing the FC-generated voltage Vf cross each other, i.e., the continuous rated output Pcr), the characteristic curve 106 representing the PDU target voltage Vp_tar decreases as the requested motor output Pmr_req increases. For example, the characteristic curve 106 representing the PDU target voltage Vp_tar is the same as the characteristic curve 104 representing the FC-generated voltage Vf between the motor outputs P1, P2.

When the requested motor output Pmr_req is greater than the motor output P2 (continuous rated output Pcr), the characteristic curve 106 representing the PDU target voltage Vp_tar is equal to the characteristic curve 100 representing the necessary motor voltage Vmr_nec. In FIG. 3, a characteristic curve 108 indicated by the two-dot-and-dash line between the motor output P1 and a motor output P3 represents a PDU target voltage Vp_tar_c according to a comparative example to be described later.

Referring back to FIG. 2, in step S3, the general controller 80 calculates a target current [A] of the FC 42 (FC target current If_tar) based on the requested motor output Pmr_req, the requested electric power of the FC unit 40 (such as the air compressor 46, etc.), and the requested electric power of the auxiliaries, not shown. The calculated FC target current If_tar is indicated to the FC controller 48. Having received the FC target current If_tar, the FC controller 48 controls the FC 42, the hydrogen tank 44, and the air compressor 46 based on an error ΔIf1 between the FC target current If_tar and the FC-generated current If detected by the current sensor 58 (ΔIf1=If_tar−If), etc.

In next step S4, the general controller 80 calculates a target voltage of the FC 42 (FC target voltage Vf_tar) using the I-V characteristic curve 102 (FIG. 4) of the FC 42. The I-V characteristic curve 102 is stored as mapped data in the memory 81 of the general controller 80. The FC target current If_tar is calculated based on not only the requested motor output Pmr_req, but also the requested electric power of the FC unit 40 and the requested electric power of the auxiliaries. Therefore, it should be noted that the position of the necessary motor voltage Vmr_nec and the position of the FC target voltage Vf_tar on the horizontal axis of FIG. 3 may be different.

In step S5, the general controller 80 determines whether the FC vehicle 10 is in the rated state or not. Specifically, the general controller 80 determines whether or not the FC target voltage Vf_tar calculated in step S4 is equal to or higher than the necessary motor voltage Vmr_nec calculated in step S2. As described above, the characteristic curve 100 representing the necessary motor voltage Vmr_nec and the characteristic curve 104 representing the FC-generated voltage Vf cross each other at the continuous rated output Pcr (motor output P2). When the motor output Pmr is equal to or smaller than the continuous rated output Pcr, the FC vehicle 10 is in the rated state, and when the motor output Pmr is greater than the continuous rated output Pcr, the FC vehicle 10 is in the non-rated state. Therefore, when the FC target voltage Vf_tar is equal to or greater than the necessary motor voltage Vmr_nec, the FC vehicle 10 is in the rated state, and when the FC target voltage Vf_tar is smaller than the necessary motor voltage Vmr_nec, the FC vehicle 10 is in the non-rated state.

If the FC vehicle 10 is in the rated state (S5: Yes), then the general controller 80 sets the FC target voltage Vf_tar as a voltage target value (voltage target value V2con_tar) after being stepped up by the second DC/DC converter 72 (V2con_tar←Vf_tar), and indicates the voltage target value V2con_tar to the second converter controller 74 in step S6. Meanwhile, the general controller 80 does not calculate a target value after being stepped up by the first DC/DC converter 50 and does not operate the first DC/DC converter 50. Consequently, the FC-generated voltage Vf is supplied to the PDU 24 through the bypass diode 54, not through the first DC/DC converter 50.

If the FC vehicle 10 is in the non-rated state (S5: No), then the general controller 80 sets the necessary motor voltage Vmr_nec calculated in step S2 as a voltage target value V2con_tar for the second DC/DC converter 72 (V2con_tar←Vmr_nec), and indicates the voltage target value V2con_tar to the second converter controller 74 in step S7. In next step S8, the general controller 80 sets the FC target current If_tar determined in step S3 as a fuel cell current target value (current target value I1con_tar) for the first DC/DC converter 50 (I1con_tar←If_tar), and indicates the current target value I1con_tar to the first converter controller 52.

(2) Processing Sequence of the First Converter Controller 52

Figure 6:
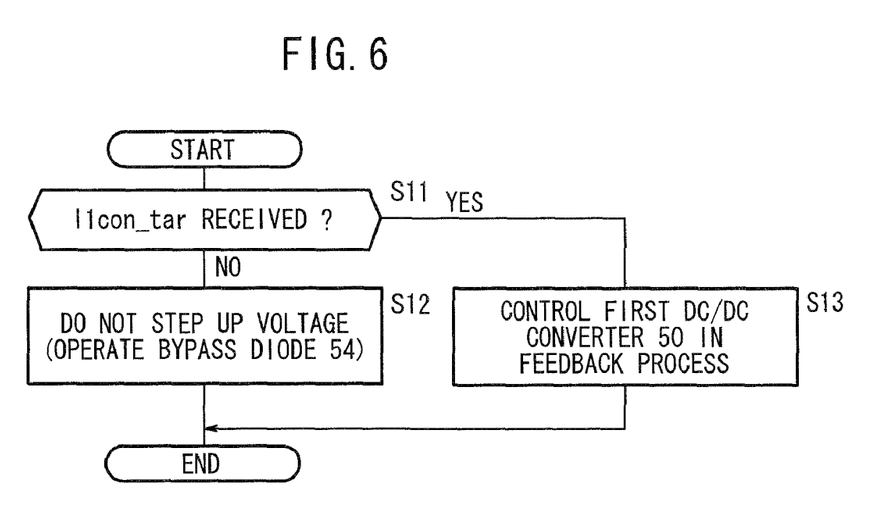
FIG. 6 is a flowchart of a processing sequence of a first converter controller according to the first embodiment.

FIG. 6 is a flowchart of a processing sequence of the first converter controller 52. In step S11, the first converter controller 52 determines whether it has received the current target value I1con_tar for the first DC/DC converter 50 or not. If the first converter controller 52 has not received the current target value I1con_tar (S11: No), then the FC vehicle 10 is considered to be in the rated state (the motor output Pmr is equal to or smaller than the continuous rated output Pcr in FIG. 3). The first converter controller 52 does not operate the first DC/DC converter 50 (does not step up the FC-generated voltage Vf), but supplies the FC-generated current If through the bypass diode 54 to the PDU 24.

If the first converter controller 52 has received the current target value I1con_tar (S11: Yes), then the FC vehicle 10 is considered to be in the non-rated state (the motor output Pmr is greater than the continuous rated output Pcr in FIG. 3). In step S13, the first converter controller 52 controls the first DC/DC converter 50 according to a feedback process using the current target value I1con_tar. Specifically, the first converter controller 52 calculates an error ΔIf2 between the current target value I1con_tar (=I1_tar) and the FC-generated current If detected by the current sensor 58 (ΔIf2=I1con_tar−If), adjusts the drive duty ratio such that the FC-generated current If is equal to the current target value I1con_tar, and steps up the FC-generated voltage Vf. At this time, the first converter controller 52 may rely on a proportional-integral-derivative control process (PID control process).

(3) Processing Sequence of the Second Converter Controller 74

Figure 7:
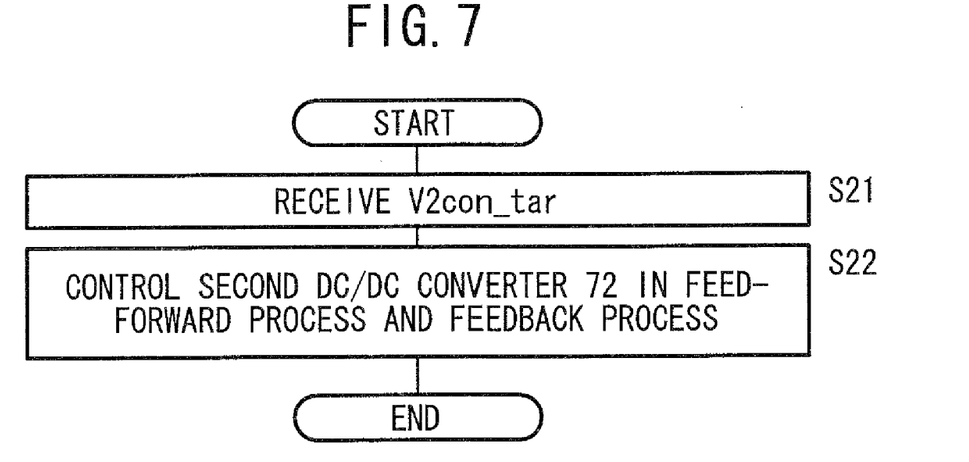
FIG. 7 is a flowchart of a processing sequence of a second converter controller according to the first embodiment.

FIG. 7 is a flowchart of a processing sequence of the second converter controller 74. In step S21, the second converter controller 74 receives the voltage target value V2con_tar for the second DC/DC converter 72 which is sent in step S6 or step S7 shown in FIG. 2. In next step S22, the second converter controller 74 controls the second DC/DC converter 72 using the voltage target value V2con_tar. Specifically, the second converter controller 74 calculates a duty ratio DUT defined according to the equations (1) through (7) shown below, and energizes the switching elements, not shown, of the second DC/DC converter 72 with the duty ratio DUT to step up the primary voltage V1.

$$DUT = FF\ term + FB\ term \tag{1}$$

$$FF\ term = 1-(V1/V2con\_tar) \tag{2}$$

$$FB\ term = P\ term + I\ term + D\ term \tag{3}$$

$$P\ term = Kp \times \Delta V2 \tag{4}$$

$$I\ term = I\ term\ previous + Ki \times \Delta V2 \tag{5}$$

$$D\ term = Kd \times (\Delta V2 - \Delta V2\ previous) \tag{6}$$

$$\Delta V2 = V2con\_tar - V2 \tag{7}$$

In the equation (1), the FF term represents a feed-forward term, and the FB term a feedback term. In the equation (3), the P term, the I term, and the D term represent the proportional term, the integral term, and the derivative term, respectively, of the proportional-integral-derivative control process (PID control process). In the equations (4) through (6), Kp, Ki and Kd represent a proportional coefficient, an integral coefficient and a derivative coefficient, respectively.

(4) Comparative Example

Figure 8:
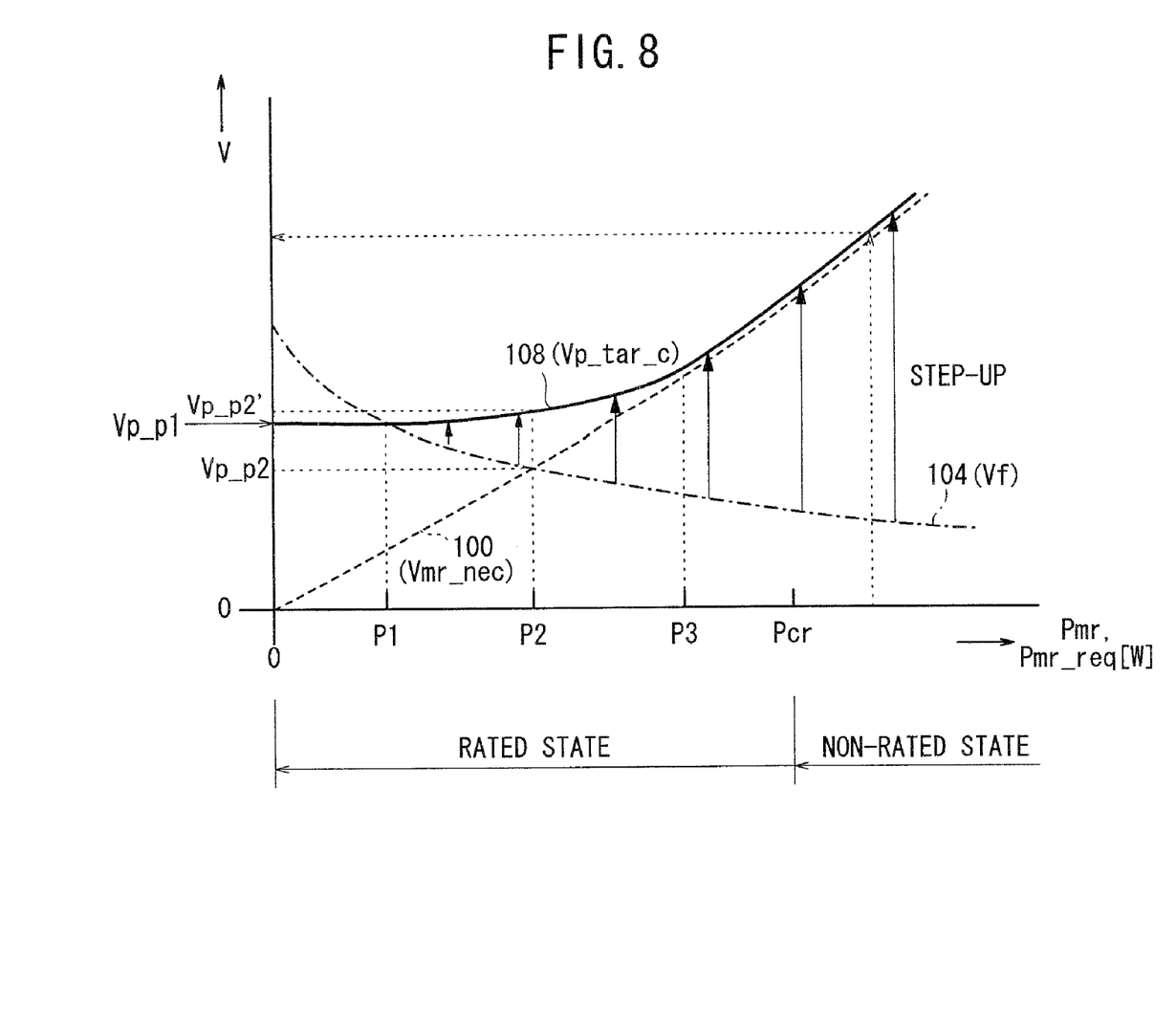
FIG. 8 is a diagram illustrative of the characteristic of a voltage required by a motor, the characteristic of a voltage generated by a fuel cell, and the characteristic of a PDU target voltage according to a comparative example.

FIG. 8 shows a comparative example for comparison with the characteristics according to the first embodiment shown in FIG. 3. The comparative example is based on FIG. 3 of U.S. Patent Application Publication No. 2007/0275276, for example. In FIG. 8, the characteristic curve 100 representing the necessary motor voltage Vmr_nec and the characteristic curve 104 representing the FC-generated voltage Vf cross each other as in FIG. 3. However, while the continuous rated output Pcr shown in FIG. 3 is set to the motor output P2 where the characteristic curve 100 representing the necessary motor voltage Vmr_nec and the characteristic curve 104 representing the FC-generated voltage Vf cross each other (Pcr=P2), the continuous rated output Pcr shown in FIG. 8 is set to a value greater than the motor output P2 (Pcr>P2).

The PDU target voltage Vp_tar_c shown in FIG. 8 is represented by a characteristic curve, which increases as the motor output Pmr increases. Therefore, the PDU target voltage Vp_tar shown in FIG. 3 is different from the PDU target voltage Vp_tar_c shown in FIG. 8 as follows:

The PDU target voltage Vp_tar_c according to the comparative example (FIG. 8) increases from Vp_p1 to Vp_p2' as the motor output Pmr increases from P1 to P2, and is greater than the FC-generated voltage Vf. Therefore, as the motor output Pmr increases from P1 to P2, the FC-generated voltage Vf needs to be stepped up according in the comparative example.

The PDU target voltage Vp_tar according to the first embodiment (FIG. 3) decreases from Vp_p1 to Vp_p2 as the motor output Pmr increases from P1 to P2. Stated otherwise, the characteristic curve 106 representing the PDU target voltage Vp_tar decreases in the same manner as the characteristic curve 104 representing the FC-generated voltage Vf in the range from the PDU target voltage Vp_p1 when the motor output Pmr is P1 to the PDU target voltage Vp_p2 when the motor output Pmr is P2. Consequently, the FC-generated voltage Vf does not need to be stepped up by the first DC/DC converter 50 when the motor output Pmr is placed between P1 and P2.

According to the comparative example (FIG. 8), furthermore, when the motor output Pmr is placed between P2 and P3, the characteristic curve 108 representing the PDU target voltage Vp_tar_c is greater than the characteristic curve 100 representing the necessary motor voltage Vmr_nec. The motor output P3 represents the motor output Pmr where the PDU target voltage Vp_tar_c according to the comparative example crosses the necessary motor voltage Vmr_nec. Therefore, when the motor output Pmr is placed between P2 and P3, the FC-generated voltage Vf needs to be stepped up in excess of the necessary motor voltage Vmr_nec in the comparative example.

The PDU target voltage Vp_tar according to the first embodiment (FIG. 3) has the same characteristic as the necessary motor voltage Vmr_nec when the motor output Pmr is placed between P2 and P3. Consequently, since the PDU target voltage Vp_tar according to the first embodiment is close to the necessary motor voltage Vmr_nec when the motor output Pmr is placed between P2 and P3, compared with the PDU target voltage Vp_tar_c according to the comparative example, excessive step-up of the FC-generated voltage Vf by the first DC/DC converter 50 can be avoided.

3. Advantages of the First Embodiment

According to the first embodiment, as described above, the first DC/DC converter 50 performs its step-up process when the FC vehicle 10 is in the non-rated state, and does not perform its step-up process when the FC vehicle 10 is in the rated state. Since the first DC/DC converter 50 does not need to perform its step-up process when the FC vehicle 10 is in the rated state, the FC vehicle 10 can save electric power. Additionally, in the specifications of the first DC/DC converter 50, it is hardly necessary to consider continuous-rating, but it is only necessary to consider time-rating. Therefore, the first DC/DC converter 50 can be reduced in size.

According to the first embodiment, the bypass diode 54 is employed to supply the FC-generated electric power Pfc from the FC 42 to the motor 22 in bypassing relation to the first DC/DC converter 50. Consequently, when the first DC/DC converter 50 does not perform its step-up process, it is possible to supply electric power from the FC 42 to the motor 22 not via the first DC/DC converter 50. At this time, any electric power consumption which would otherwise be caused by the internal resistance of the first DC/DC converter 50 is avoided.

The second converter controller 74 according to the first embodiment performs a voltage target value control process for the second DC/DC converter 72 in either one of the rated state and the non-rated state, and uses different control target values (the FC target voltage Vf_tar and the necessary motor voltage Vmr_nec) respectively in the rated state and the non-rated state. Since the second converter controller 74 uses the different voltage control target values in the rated state and the non-rated state, the second converter controller 74 can control operation of the second DC/DC converter 72 differently in the rated state and the non-rated state.

Moreover, the second converter controller 74 uses the FC target voltage Vf_tar as a voltage control target value in the rated state and uses the necessary motor voltage Vmr_nec as a voltage control target value in the non-rated state. Since the second converter controller 74 uses the FC target voltage Vf_tar as a voltage control target value in the rated state, it is possible to take into account the electric generation efficiency of the FC 42. Since the second converter controller 74 uses the necessary motor voltage Vmr_nec as a voltage control target value in the non-rated state, the necessary motor voltage Vmr_nec can reliably be realized.

According to the first embodiment, the FC vehicle 10 has the memory 81 of the general controller 80 which stores mapped data of requested motor outputs Pmr_req and necessary motor voltages Vmr_nec. Since requested motor outputs Pmr_req and necessary motor voltages Vmr_nec are available as mapped data, the general controller 80 can quickly determine the necessary motor voltage Vmr_nec.

According to the first embodiment, the general controller 80 compares the FC target voltage Vf_tar and the necessary motor voltage Vmr nec with each other, and determines whether the FC vehicle 10 is in the rated state or the non-rated state based on the result of the comparison. Since the result of the comparison between the FC target voltage Vf_tar and the necessary motor voltage Vmr_nec is used as a basis for judgment, the general controller 80 can reliably determine whether the FC-generated voltage Vf is lower than the necessary motor voltage Vmr_nec or not.

B. Second Embodiment

1. Differences with the First Embodiment

Figure 9:
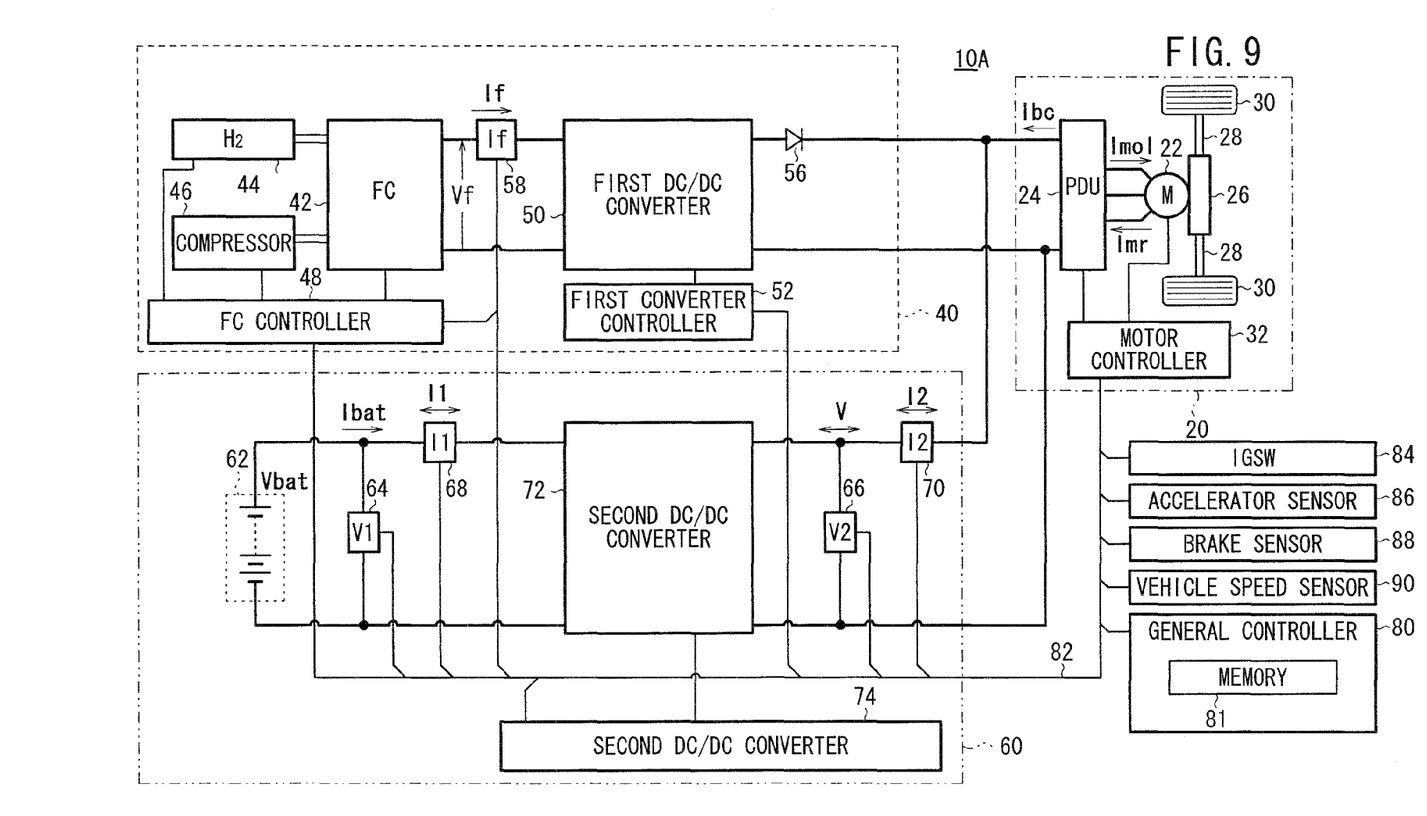
FIG. 9 is a block diagram of a fuel cell vehicle according to a second embodiment of the present invention.

FIG. 9 is a block diagram of a fuel cell vehicle 10A (hereinafter also referred to as "FC vehicle 10A") according to a second embodiment of the present invention. The FC vehicle 10A according to the second embodiment is basically the same as the FC vehicle 10 according to the first embodiment, but is different therefrom in that it does not have the bypass diode 54. Instead, the FC vehicle 10A has a duty ratio DUT of 100% for the switching elements, not shown, of the first DC/DC converter 50, directly connecting the FC42 side and the PDU24 side of the first DC/DC converter 50 to each other. The FC-generated voltage Vf is thus supplied to the PDU 24 without being stepped up by the first DC/DC converter 50.

Figure 10:
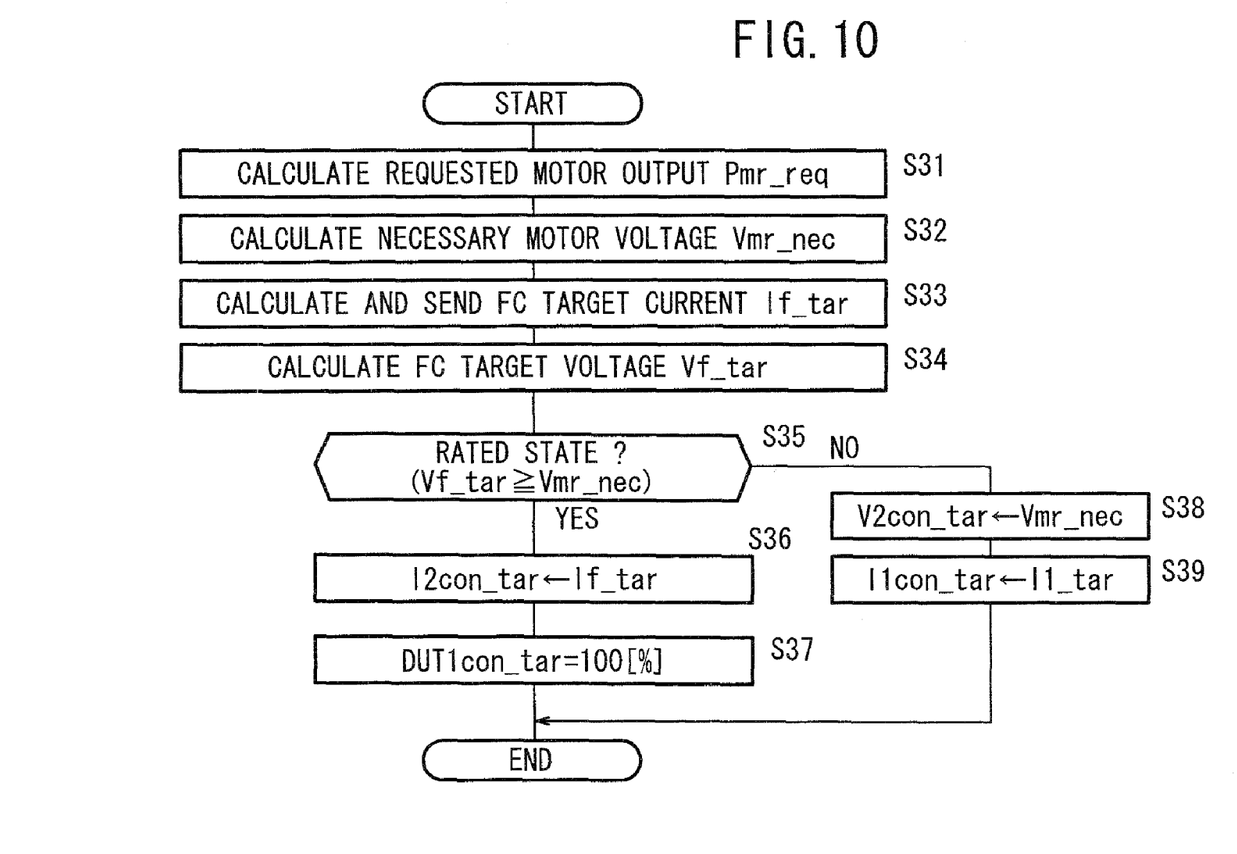
FIG. 10 is a flowchart of a processing sequence of a general controller according to the second embodiment.

FIG. 10 is a flowchart of a processing sequence of the general controller 80 of the FC vehicle 10A for calculating control target values used by the first DC/DC converter 50 and the second DC/DC converter 72.

Steps S31 through S35, S38, S39 shown in FIG. 10 are identical to steps S1 through S5, S7, S8 shown in FIG. 2. In step S36, the general controller 80 does not calculate a voltage target value V2con_tar after being stepped up as a control target value for the second DC/DC converter 72, but calculates a current target value I2con_tar which represents the current in the fuel cell side of the first DC/DC converter 50 for use as a control target value for the second DC/DC converter 72. The current target value I2con_tar is sent to the second converter controller 74. Having received the current target value I2con_tar, the second converter controller 74 calculates an error ΔIf3 between the current target value I2con_tar and the FC-generated current If detected by the current sensor 58

($\Delta$If3=I2con_tar−If), and controls the second DC/DC converter 72 according to a feedback process in order to eliminate the error $\Delta$If3.

In next step S37, the general controller 80 calculates a target duty ratio DUT1con_tar of 100% as a control target value (control command) for the first DC/DC converter 50. The target duty ratio DUT1con_tar of 100% is sent to the first converter controller 52. Having received the target duty ratio DUT1con_tar of 100%, the first converter controller 52 continuously turns on the switching elements, not shown, of the first DC/DC converter 50, directly connecting the FC42 side and the PDU24 side of the first DC/DC converter 50 to each other. The first DC/DC converter 50 thus supplies the FC-generated voltage Vf to the PDU 24 without stepping up the FC-generated voltage Vf.

2. Advantages of the Second Embodiment

The second embodiment offers the following advantages in addition to or instead of the advantages described with respect to the first embodiment.

The second converter controller 74 according to the second embodiment performs a current target value control process for the second DC/DC converter 72 in the rated state and performs a voltage target value control process for the second DC/DC converter 72 in the non-rated state. Since the second converter controller 74 performs the current target value control process in the rated state and performs the voltage target value control process in the non-rated state, the second converter controller 74 can control operation of the second DC/DC converter 72 differently in the rated state and the non-rated state.

Moreover, the second converter controller 74 uses the FC target current If_tar as a current target value in the rated state and uses the necessary motor voltage Vmr_nec as a voltage target value in the non-rated state. Since the second converter controller 74 uses the FC target current If_tar as a current target value in the rated state, it is possible to take into account the electric generation efficiency of the FC 42. Since the second converter controller 74 uses the necessary motor voltage Vmr_nec as a voltage target value in the non-rated state, the necessary motor voltage Vmr_nec can reliably be realized.

C. Modifications

The present invention is not limited to the above embodiments, but may employ various arrangements based on the disclosure of the present description. For example, the present invention can employ the following arrangements:

In each of the above embodiments, the fuel cell vehicle has the battery 62 in addition to the FC 42 as an electric power supply. However, the fuel cell vehicle may have only the FC 42 as an electric power supply.

In the above embodiments, the result of the comparison between the FC target voltage Vf_tar and the necessary motor voltage Vmr_nec is used as to determine whether the fuel cell vehicle is in the rated state or in the non-rated state. However, the result of the comparison between the FC-generated voltage Vf and the necessary motor voltage Vmr_nec may be used.

In the above embodiments, the data of requested motor outputs Pmr_req and necessary motor voltages Vmr_nec are mapped and stored. However, necessary motor voltages Vmr_nec may successively be calculated based on requested motor outputs Pmr_req.

In the above embodiments, the processing sequences are distributed across a plurality of controllers (the general controller 80, the motor controller 32, the FC controller 48, the first converter controller 52, and the second converter controller 74). However, all the processing sequences may be carried out by a single controller (e.g., the general controller 80).

The invention claimed is:

1. A method of controlling a fuel cell vehicle comprising a traction motor, a fuel cell, a first DC/DC converter for stepping up an output voltage of the fuel cell and supplying the stepped-up voltage to the traction motor, an electric storage device, a second DC/DC converter disposed between the traction motor and the electric storage device, and a controller for controlling the supply of electric power to the traction motor, the method comprising the steps of:

setting the output voltage of the fuel cell to be higher than a necessary voltage of the traction motor when the fuel cell vehicle is in a rated state in which the traction motor operates to produce an output smaller than a continuous rated output thereof, and setting the output voltage of the fuel cell to be lower than the necessary voltage of the traction motor when the fuel cell vehicle is in a non-rated state in which the traction motor operates to produce an output larger than the continuous rated output;

by the controller, controlling the first DC/DC converter to step up the output voltage of the fuel cell when the controller judges that the output voltage of the fuel cell is lower than the necessary voltage of the traction motor;

by the controller, performing a current target value control process for the second DC/DC converter in the rated state; and by the controller, performing a voltage target value control process for the second DC/DC converter in the non-rated state, wherein the continuous rated output represents a rated guaranteed output as an output of the traction motor that is required for the fuel cell vehicle to climb a target gradient at a target vehicle speed which serves as a vehicle power performance target value; the rated state is a traction motor driving state for driving the traction motor at an output equal to or smaller than the rated guaranteed output; and the non-rated state is a traction motor driving state for driving the traction motor at an output greater than the rated guaranteed output.

2. A method of controlling a fuel cell vehicle according to claim 1, wherein the fuel cell vehicle further comprises: a bypass diode for supplying electric power from the fuel cell to the traction motor in bypassing relation to the first DC/DC converter.

3. A method of controlling a fuel cell vehicle according to claim 1, further comprising the steps of: by the controller, calculating a target current for the fuel cell; and by the controller, using the target current for the fuel cell as the current target value in the rated state and using the necessary voltage of the traction motor as the voltage target value in the non-rated state.

4. A method of controlling a fuel cell vehicle according to claim 1, wherein the fuel cell vehicle further comprises: a storage unit storing mapped data of requested outputs and necessary voltages of the traction motor.

5. A method of controlling a fuel cell vehicle according to claim 1, further comprising the step of: by the controller, comparing a target voltage for the fuel cell and the necessary voltage of the traction motor with each other, and determining whether the fuel cell vehicle is in the rated state or in the non-rated state, based on the result of the comparison.

6. A method of controlling a fuel cell vehicle comprising a traction motor, a fuel cell, a first DC/DC converter for stepping up an output voltage of the fuel cell and supplying the stepped-up voltage to the traction motor, an electric storage device, a second DC/DC converter disposed between the traction motor and the electric storage device, and a controller for controlling the supply of electric power to the traction motor, the method comprising the steps of:

setting the output voltage of the fuel cell to be higher than a necessary voltage of the traction motor when the fuel cell vehicle is in a rated state in which the traction motor operates to produce an output smaller than a continuous rated output thereof, and setting the output voltage of the fuel cell to be lower than the necessary voltage of the traction motor when the fuel cell vehicle is in a non-rated state in which the traction motor operates to produce an output larger than the continuous rated output;

by the controller, controlling the first DC/DC converter to step up the output voltage of the fuel cell when the controller judges that the output voltage of the fuel cell is lower than the necessary voltage of the traction motor;

by the controller, constantly performing a voltage target value control process for the second DC/DC converter in either one of the rated state and the non-rated state; and by the controller, using different voltage target values respectively in the rated state and the non-rated state, wherein the continuous rated output represents a rated guaranteed output as an output of the traction motor that is required for the fuel cell vehicle to climb a target gradient at a target vehicle speed which serves as a vehicle power performance target value; the rated state is a traction motor driving state for driving the traction motor at an output equal to or smaller than the rated guaranteed output; and the non-rated state is a traction motor driving state for driving the traction motor at an output greater than the rated guaranteed output.

7. A method of controlling a fuel cell vehicle according to claim 6, wherein the fuel cell vehicle further comprises: a bypass diode for supplying electric power from the fuel cell to the traction motor in bypassing relation to the first DC/DC converter.

8. A method of controlling a fuel cell vehicle according to claim 6, further comprising the steps of: by the controller, calculating a target current for the fuel cell, and calculating a target voltage for the fuel cell from the target current; and by the controller, using the target voltage for the fuel cell as the voltage target value in the rated state and using the necessary voltage of the traction motor as the voltage target value in the non-rated state.

9. A method of controlling a fuel cell vehicle according to claim 6, wherein the fuel cell vehicle further comprises: a storage unit storing mapped data of requested outputs and necessary voltages of the traction motor.

10. A method of controlling a fuel cell vehicle according to claim 6, further comprising the step of: by the controller, comparing a target voltage for the fuel cell and the necessary voltage of the traction motor with each other, and determining whether the fuel cell vehicle is in the rated state or in the non-rated state, based on the result of the comparison.

11. A method of controlling a fuel cell vehicle comprising a traction motor, a fuel cell, a DC/DC converter for stepping up an output voltage of the fuel cell and supplying the stepped-up voltage to the traction motor, and a controller for controlling the supply of electric power to the traction motor, the method comprising the steps of:

setting the output voltage of the fuel cell to be higher than a necessary voltage of the traction motor when the fuel cell vehicle is in a rated state in which the traction motor operates to produce an output smaller than a continuous rated output thereof, and setting the output voltage of the fuel cell to be lower than the necessary voltage of the traction motor when the fuel cell vehicle is in a non-rated state in which the traction motor operates to produce an output larger than the continuous rated output; and by the controller, controlling the DC/DC converter to step up the output voltage of the fuel cell when the controller judges that the output voltage of the fuel cell is lower than the necessary voltage of the traction motor, wherein the continuous rated output represents a rated guaranteed output as an output of the traction motor that is required for the fuel cell vehicle to climb a target gradient at a target vehicle speed which serves as a vehicle power performance target value;

the rated state is a traction motor driving state for driving the traction motor at an output equal to or smaller than the rated guaranteed output; and the non-rated state is a traction motor driving state for driving the traction motor at an output greater than the rated guaranteed output.

* * * * *